April 4, 1961 L. W. PETERS 2,977,655
BUCKLES
Filed Oct. 18, 1956 3 Sheets-Sheet 1
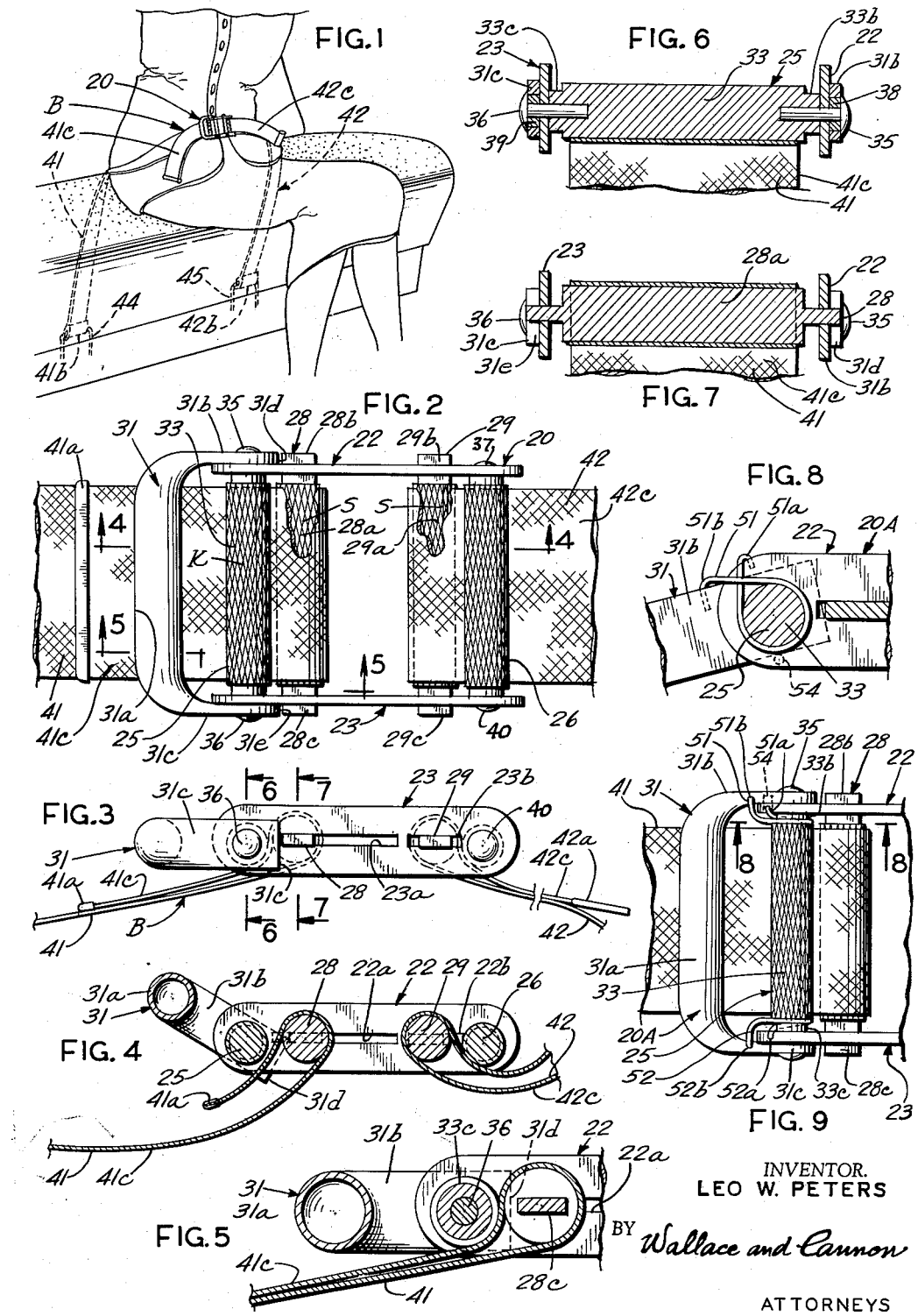
INVENTOR.
LEO W. PETERS
BY Wallace and Cannon
ATTORNEYS April 4, 1961 L. W. PETERS 2,977,655
BUCKLES
Filed Oct. 18, 1956 3 Sheets-Sheet 2

INVENTOR.
LEO W. PETERS
BY
*Wallace and Cannon*
ATTORNEYS

April 4, 1961  L. W. PETERS  2,977,655
BUCKLES
Filed Oct. 18, 1956  3 Sheets-Sheet 3
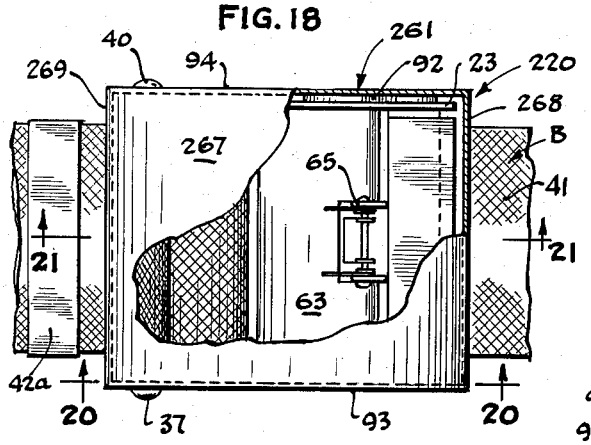
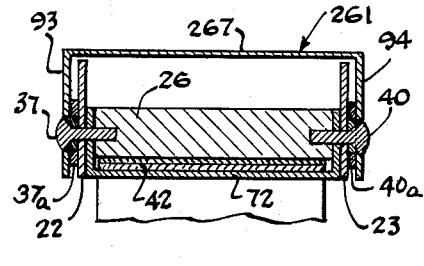
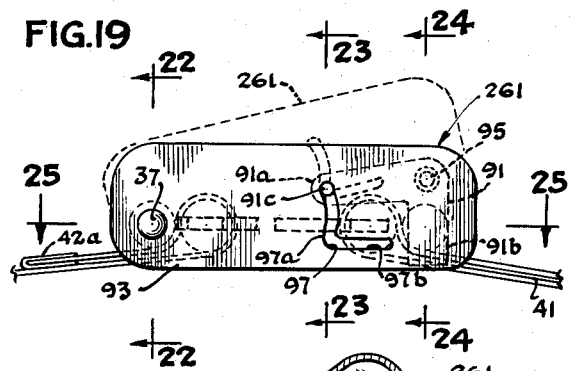
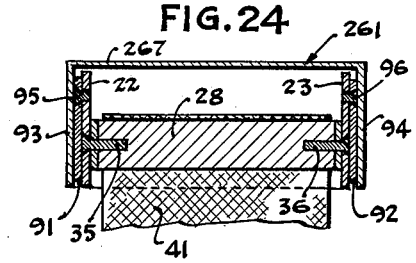
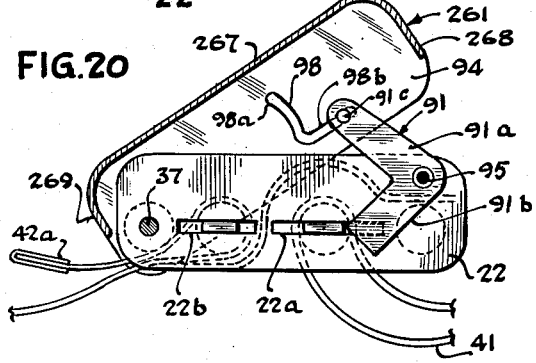
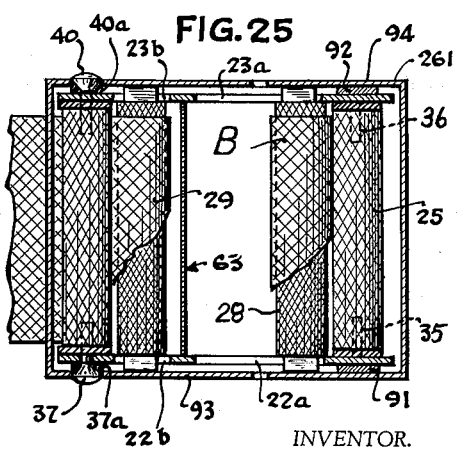
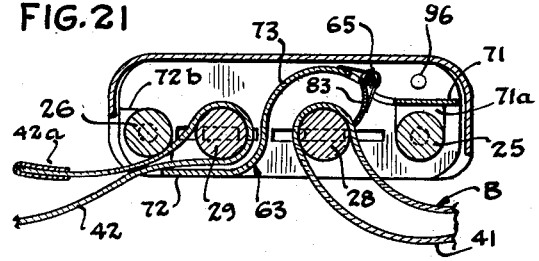
INVENTOR.
LEO W. PETERS
BY
Wallace and Cannon
ATTORNEYS

United States Patent Office 2,977,655
Patented Apr. 4, 1961

2,977,655
BUCKLES
Leo W. Peters, 424 N. Harvey Ave., Oak Park, Ill.

Filed Oct. 18, 1956, Ser. No. 616,826

11 Claims. (Cl. 24—196)

This invention relates to buckles and, more specifically, to buckles which are particularly well adapted for use on seat belts in automobiles, aircraft, and the like.

It is a primary object of my invention to provide a novel buckle which is particularly useful on seat belts or safety belts for use in automobiles, aircraft or the like.

Buckles have been heretofore known in the art for use on such seat belts or safety belts and the like, but those buckles which have been previously known have had several inherent disadvantages such as, for example, being expensive to manufacture; being complicated in construction and operation; not holding the belt securely to properly withstand the forces which such a belt must be capable of withstanding; not being quickly and easily releasable when a load is applied to the belt such as, for example, when a person is suspended thereby in up-side-down position; engaging the belt with which it is used so as to undesirably wear and thereby weaken the belt, or the like. It is an important object of my invention to overcome such disadvantages.

Another object of my invention is to afford a novel buckle for seat belts and the like, which will not slip under the loads which it must be capable of withstanding in order to afford an effective safety belt under all practical conditions of operation.

A further object of my invention is to afford a novel buckle of the aforementioned type which frictionally grips the belt in such a manner that the grip on the belt is increased under load in a novel and expeditious manner.

Another object of my invention is to afford a novel buckle of the aforementioned type which is quickly releasable in a novel and expeditious manner.

Yet another object of my invention is to afford such a novel buckle which is quickly releasable by the exertion of relatively little manually applied force even under loaded conditions.

A further object of my invention is to afford a novel buckle of the aforementioned type which is quickly and easily engaged with the belt in proper holding position.

Another object of my invention is to reduce wear and weakening of safety belts and the like, by the buckles used to hold the two ends of the safety belts together.

Yet another object of my invention is to afford a novel belt of the aforementioned type wherein, in the operation thereof, the belt to be held is gripped thereby in a manner to minimize wear on the belt so held.

Another object of my invention is to insure threading of a belt in the proper manner into a buckle of the aforementioned type.

A further object of my invention is to provide a novel buckle of the aforementioned type which embodies mechanism therein constituted and arranged in a novel and expeditious manner to effectively prevent improper threading of a belt thereinto.

Another object of my invention is to provide a novel buckle of the aforementioned type which may embody a handle constituted and arranged in a novel and expeditious manner for releasing the buckle from such a belt.

Another object of my invention is to enable a novel quickly-releasable buckle of the aforementioned type to embody a housing in a novel and expeditious manner.

Yet another object of my invention is to enable a novel buckle of the aforementioned type to be afforded which embodies a housing constituted and arranged in a novel and expeditious manner to afford a handle for releasing the buckle from such a belt.

A further object of my invention is to afford a novel buckle of the aforementioned type which is relatively small in size.

Another object of my invention is to afford a buckle of the aforementioned type which may be readily and economically produced commercially and which is relatively simple and easy to operate, but is reliable and efficient in operation.

Other and further objects of the present invention will be apparent from the following description and claims and are illustrated in the accompanying drawings which, by way of illustration show the preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention.

In the drawings:

Fig. 1 is a perspective view of a buckle embodying the principles of my invention showing the buckle mounted on a seat belt being used in an automobile, or the like;

Fig. 2 is a top plan view of the buckle shown in Fig. 1;

Fig. 3 is a side elevational view of the buckle shown in Fig. 2;

Fig. 4 is a longitudinal sectional view taken substantially along the line 4—4 in Fig. 2, but with parts of the buckle shown in different position;

Fig. 5 is a detail section view taken substantially along the line 5—5 in Fig. 2;

Fig. 6 is a detail sectional view taken substantially along the line 6—6 in Fig. 3;

Fig. 7 is a detail sectional view taken substantially along the line 7—7 in Fig. 3;

Fig. 8 is a detail sectional view similar to Fig. 5 but showing a modified form of my invention;

Fig. 9 is a segmental plan view somewhat similar to Fig. 2 but showing the modified form of my invention shown in Fig. 8;

Fig. 18 is a top plan view, somewhat similar to Fig. 10 but showing another modified form of my invention;

Fig. 19 is a side elevational view of the buckle shown in Fig. 18;

Fig. 20 is a sectional view taken substantially along the line 20—20 in Fig. 18, but with parts thereof shown disposed in different positions;

Fig. 21 is a longitudinal sectional view taken substantially along the line 21—21 in Fig. 18;

Fig. 22 is a sectional view taken substantially along the line 22—22 in Fig. 19;

Fig. 23 is a sectional view taken substantially along the line 23—23 in Fig. 19;

Fig. 24 is a sectional view taken substantially along the line 24—24 in Fig. 19; and Fig. 25 is a sectional view taken substantially along the line 25—25 in Fig. 19.

Figure 10:
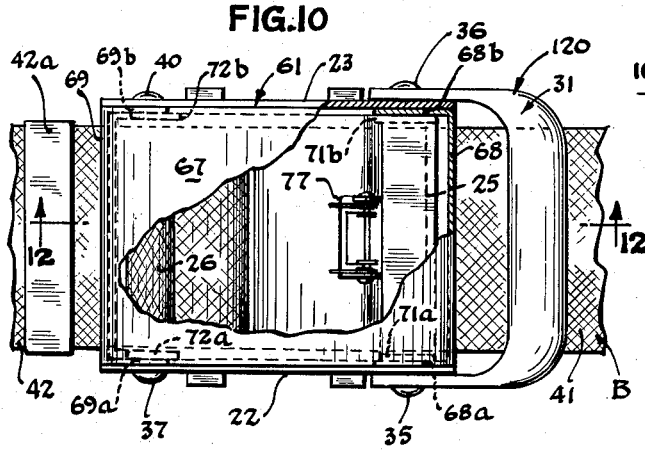
Fig. 10 is a top plan view, somewhat similar to Fig. 2 but showing another modified form of my invention, and having certain parts broken away so as to show underlying parts.

To illustrate the principles of my invention, a buckle 20, comprising one embodiment of my invention is shown in Figs. 1 to 7, inclusive of the drawings.

The buckle 20 embodies, in general, two substantially parallel elongated side rails 22 and 23, having two end bars 25 and 26 and the two slide bars 28 and 29 extending therebetween, a handle 31, affording a camming lever for moving the slide bar 28 away from the end bar 25, being pivotally mounted on the end bar 25, all of which will be discussed in greater detail hereinafter, Figs. 2, 3 and 4.

The buckle 20 is particularly well adapted to releasably secure together the two ends of a safety belt, or the like, such as the ends 41 and 42 of the belt B shown in the drawings.

Normally, in the use of safety belts, seat belts, and the like, one end portion of each end of the belt such as, for example, the end portions 41b and 42b of the ends 41 and 42 of the belt B, Fig. 1, are attached to suitable securing members, such as brackets 44 and 45, secured to a suitable frame member of the vehicle in which the belt is being used. The free end portions of the ends of such a belt, such as, for example, the free end portions 41c and 42c of the ends 41 and 42 of the belt B, are preferably releasably secured together in such position that when the belt is fastened around a wearer thereof, in normal position of use, the buckle or other securing member, connecting the two free end portions of the belt together is disposed directly in front of the wearer. In order that such a belt may be adjusted in size to properly fit users thereof of different sizes, and properly dispose the buckle in the aforementioned preferred position, it is desirable that both ends of the belt, such as the ends 41 and 42 of the belt B, be adjustably mounted in the buckle, and with my novel buckle 20 adjustment of both ends of the belt being held thereby may be quickly and easily accomplished as will be discussed in greater detail presently.

Also, it has been found that in order to afford a practical seat belt or safety belt for use in automobiles, airplanes, and the like, the belt, when closed, should be capable of withstanding forces of at least three thousand pounds, which means, of course, that the buckle securing the ends of the belt together must be capable of withstanding such a force without appreciable slipping and without cutting or otherwise weakening the belt in such a manner as to cause the belt to break when subjected to such a force. With my novel invention, I have afforded a buckle which may be readily constructed to withstand such forces and which does not so cut or weaken the belt being secured together thereby.

In addition, it is desirable that a buckle being used to hold together the two ends of a seat belt, safety belt, or the like, be quickly and easily manually releasable by the exertion of not more than forty pounds of force even under the extreme condition of the belt supporting the full weight of an adult, such as, for example, when an adult is suspended thereby in upside down position. This is, of course, so that a relatively weak person such as, for example, a child, or an adult who has been weakened by injury, or the like, can quickly and easily free himself, or another person in the event of an emergency. With my invention I have also afforded a novel buckle which affords a practical and efficient buckle for a seat belt, safety belt, or the like, for securely holding the ends of such a belt together, but which may quickly and easily be released by the manual exertion of relatively little force when it is desired to release the belt, even under such emergency conditions, as will be discussed in greater detail presently.

The side rails 22 and 23 of the buckle 20 may be made of any suitable material such as, for example, sheet steel, and each side rail has two substantially straight, elongated, longitudinally aligned slots 22a and 22b, and 23a and 23b, respectively, formed in the opposite end portions thereof and terminating in spaced relation to each other and to the ends of the side rails 22 and 23, Figs. 3 and 4. The slots 22a and 22b, and 23a and 23b, respectively, extend along the longitudinal center lines of the side rails 22 and 23, respectively, with the two slots 22a and 22b, and 23a and 23b in each of the side rails 22 and 23 terminating at their inner ends in spaced relation to each other, and terminating at their outer ends in adjacent, but spaced relation to the end rails 25 and 26, respectively.

The slide bar 28 may be made of any suitable material such as, for example, steel, and embodies an elongated substantially cylindrical shaped body portion 28a, preferably having a knurled outer surface S, Fig. 2, and two flat substantially rectangular shaped end portions 28b and 28c projecting from the opposite ends thereof. The slide bar 28 extends between the side rails 22 and 23, with the body portion 28a thereof disposed between the side rails 22 and 23 and the end portions 28b and 28c extending outwardly through the slots 22a and 23a, respectively, Figs. 2, 3 and 4. The slots 22a and 23a are of such width that the ends 28b and 28c of the slide bar 28 are held against rotation therein but are freely slidable longitudinally thereof.

Similarly, the slide bar 29 may be made of any suitable material such as, for example, steel and embodies an elongated substantially cylindrical shaped central body portion 29a, and preferably having a knurled outer surface S, Fig. 2, and two flat substantially rectangular shaped end portions 29b and 29c, the slide bar 29 being mounted between the side rails 22 and 23 with the end portions 29b and 29c thereof extending through the slots 22b and 23b, respectively, in the same manner that the end portions 28b and 28c of the slide bar 28 are disposed in the slots 22a and 23a.

The end bar 25 embodies a substantially cylindrical shaped body portion 33 disposed between the side rails 22 and 23 with the opposite ends of the body portion 33 disposed in abutting engagement with the inner faces of the side rails 22 and 23, respectively, Figs. 2 and 6, the body portion 33 also preferably having a knurled peripheral surface K, as best shown in Fig. 2. Two rivets 35 and 36 extend through the side rails 22 and 23 and are secured in the opposite end portions of the body portion 33 to thereby non-rotatably secure the body portion 33 in position between the side rails 22 and 23. Two annular shaped bearing members 38 and 39 made of suitable material such as, for example, bronze or steel, are mounted on the rivets 35 and 36 between the heads thereof and the side rails 22 and 23, respectively, Fig. 6.

The end bar 26 is similar in shape and construction to the end bar 25, and is mounted between the other end portion of the side rails 22 and 23 in parallel relation to the end bar 25. The end bar 26 is non-rotatably secured in position between the side rails 22 and 23 by two rivets 37 and 40, Fig. 2.

The handle 31 is substantially U-shaped, having an elongated intermediate leg 31a from the opposite ends of which project two elongated substantially parallel end legs 31b and 31c, Fig. 2. The free end portions of the end legs 31b and 31c are journalled on the bearing members 38 and 39, respectively, between the side rails 22 and 23 and the heads of the rivets 35 and 36, respectively, Fig. 6. The free end edges 31d and 31e of the legs 31b and 31c, respectively, of the handle 31, Figs. 3 and 4, are preferably perpendicular to the length of the legs 31b and 31c, and are disposed at such a distance from the rivets 35 and 36 that, when the handle 31 is disposed in position wherein the legs 31b and 31c are substantially parallel to the side rails 22 and 23, Figs. 2 and 3, the free end edges 31d and 31e are disposed adjacent to but outwardly of the outer ends of the slots 22a and 23a, respectively.

The slots 22a and 23a are so disposed in the side rails 22 and 23, respectively, that the outer ends thereof terminate sufficiently close to the end bar 25 that the slide bar 28 may be moved outwardly along the slots 22a and 23a into position wherein the body portion 28a of the slide bar 28 is disposed in abutting relation to the roller 33. The slots 22a and 23a are of such length that the slide bar 28 may be manually moved longitudinally of the side rails 22 and 23 away from the end bar 25 a sufficient distance that the free end portion 41c of the end 41 of the seat belt or safety belt B, Figs. 1, 2, and 3, may be readily fed, free end first, inwardly between the side rails 22 and 23, under the body portion 28a of the slide bar 28, and then upwardly around the body portion 28a and downwardly between the body portion 28a and the end bar 25 and then outwardly of the side rails 22 and 23. With the free end portion 41c of the belt B threaded in this manner around the slide bar 28, tension applied to the end portion 41b of the belt is effective to slide the slide bar 28 outwardly into position to clamp the portion of the belt B disposed between the slide bar 28 and the end bar 25 against the end bar 25 to thereby hold the end portion 41 of the belt B from being withdrawn from the buckle 20. When it is desired to release the end portion 41 of the belt B from the buckle 20, this may be readily accomplished by pulling upwardly on the intermediate leg 31a of the handle 31, to thereby rotate the handle 31 in a clockwise direction, as viewed in Fig. 3, from its normal position, wherein it is disposed in substantially parallel relation to the side rails 22 and 23, as shown in Fig. 3, to its "release" position wherein the intermediate leg 31a is disposed upwardly from the side rails 22 and 23, as shown in Fig. 4. This movement of the handle 31 from its normal position to its release position is effective to rotate the legs 31b and 31c thereof on the bearings 38 and 39 so that the upper portions of the free ends 31d and 31e of the legs 31b and 31c are moved inwardly along the side rails 22 and 23 into position to effectively cam the end portions 28b and 28c respectively, of the slide bar 28 inwardly along the slots 22a and 23a, respectively. The upper end portions of the free ends of the legs 31b and 31c are of such length that when the handle 31 is disposed in its release position as shown in Fig. 4, the slide bar 28 is cammed inwardly by the free ends of the legs 31b and 31c of the handle 31 a sufficient distance that the free end portion 41c of the belt B may be readily pulled from the buckle 20.

In most instances, belts such as, for example, the belt B, used as seat belts, safety belts or the like, have tips on the free end portion thereof such as the tip 41a shown in the drawings, made of suitable material such as, for example, steel, or the like, with the tip having a considerably greater width than thickness. In order to assure that a belt, such as the belt B, may be quickly and effectively released from the buckle 20, I have found that the handle 31 should be effective, when in the aforementioned release position, to dispose the body portion 28a of the slide bar 28 away from the body portion 33 a distance not less than the width of such a tip. Thus, for example, if the width of the tip 41a of the belt B is one-quarter of an inch, and the thickness thereof is one-eighth of an inch, the legs 31b and 31c of the handle 31 should be so positioned relative to the rivets 35 and 36 that the free ends 31d and 31e are effective to cam the slide bar 28 away from the end bar 25 a distance not less than a quarter of an inch when the handle 31 is disposed in release position.

Also, it is desirable that the handle 31 be capable of being manually moved to release position by the exertion of a force of forty pounds, or less, thereon even when the buckle 20 is holding a belt which is supporting the full weight of a person using the same such as, for example, when a person is suspended thereby in upside-down position. This may be readily accomplished by properly proportioning the distances of the camming surfaces afforded by the free ends 31d and 31e of the legs 31b and 31c from the longitudinal centers of the rivets 35 and 36, respectively, to the distance of the intermediate leg 31a of the handle 31 from the longitudinal center lines of the rivets 35 and 36.

So that the buckle 20 may be readily disposed in centered position on a user thereof, I prefer to secure the end 42 of the belt B with an adjustable connection. In the form of my novel invention shown in the accompanying drawings, this is accomplished by threading the free end portion 42c of the end 42 of the belt B inwardly between the side rails 22 and 23, below the slide bar 29 and then upwardly around the body portion 29a of the slide bar 29 and downwardly between the slide bar 29 and the end bar 26, and then outwardly from the side rails 22 and 23, all of this threading operation being performed before the tip 42a is mounted on the end 42 of the belt B. The outer ends of the slots 22b and 23b are disposed sufficiently close to the end bar 26 that the slide bar 29 may be moved outwardly along the slots 22b and 23b into abutting engagement with the end bar 26, when no belt B is disposed therebetween, and is of such length as to readily permit the threading of the end portion 42c of the end 42 of the belt B between the slide bar 29 and the end bar 26 in the aforementioned manner when no tip is disposed on the free end portion 42c of the end 42. After the free end portion 42c of the end 42 of the belt B has thus been threaded between the slide bar 29 and the end bar 26 a tip 42a may be mounted on the free end portion 42c which is of such width and thickness that it may not be withdrawn between the slide bar 29 and the end bar 26 even when the slide bar 29 is disposed in its innermost position in the slots 22b and 23b. This, it will be seen, affords an effective adjustment for the length of the end 42 of the belt B but prevents the buckle 20 from being entirely removed therefrom. Also, it affords a practical permanent guide for showing how the other end 41 of the belt should be threaded into the other end of the buckle 20.

I have found that, when using twenty-two hundred and fifty pound test nylon webbing, two inches wide, for the belt B, and with a tip having a width of one-quarter of an inch and a thickness of one-eighth of an inch, end bars 25 and 26, and slide bars 28 and 29 having a diameter of three-eighths of an inch afford effective securing members for the belt B which are sufficiently wide that they do not cut the belt or excessively bend the latter.

In Figs. 8 and 9 of the drawings a buckle 20A is shown which comprises a modified form of my invention. The buckle 20A is of the same construction as the buckle 20, shown in Figs. 1 to 7, inclusive, except that two torsion springs 51 and 52 are mounted around the opposite end portions of the body portion 33 of the end bar 25 between the shoulders 33b and 33c, formed at the opposite ends thereof, and the side rails 22 and 23, respectively, and a pin 54 is mounted in and projects outwardly from the side rail 22 below the leg 31b of the handle 31 in position to engage the leg 31b and thereby limit the rotation of the handle 31 in a counter-clockwise direction as viewed in Fig. 8.

One end 51a and 52a of each of the springs 51 and 52, respectively, is secured in the upper edge portion of the side rails 22 and 23, respectively. Similarly, the other end 51b and 52b of the spring 51 and 52 is mounted in the upper edge portion of the legs 31b and 31c of the handle 31.

The torsion springs 51 and 52 are so arranged on the handle 31 and the side rails 22 and 23 as to be effective to yieldingly urge the handle 31 into the position shown in Figs. 8 and 9, wherein the legs 31b and 31c project outwardly and downwardly from the end bar 25 and the lower face of the leg 31b is disposed in engagement with the pin 54. Such construction tends to hold the handle 31 in closer relation to the body of the persons wearing the same so as to insure that it does not afford an objectionable outward protuberance. When it is desired to release the buckle 20A, it is merely necessary to manually rotate the handle 31 in a clockwise direction from the position shown in Fig. 8 in the same manner as heretofore discussed with respect to the buckle 20, the only difference being that in so rotating the handle 31 of the buckle 20A, sufficient additional force must be exerted to overcome the relatively light force exerted by the torsion springs 51 and 52 on the handle 31.

The modified form of my buckle which I have shown in Figs. 10 to 17, inclusive, operates on the same principle as the preferred form of the buckle illustrated in Figs. 1 to 7, inclusive, and like reference numerals have been used on like parts, and same reference numerals with the prefix 1 have been used on parts which are similar but which have been substituted for parts of the preferred form of my invention. All of the changes made in the modified form of my invention over the preferred form as shown are embodied in the casing and the belt guiding structure embodied in this modified form of my invention.

It will be noted that the changes made in the modified form of my invention comprise the following: A cover 61 has been added thereto and a guide plate 63 having a guard plate 65 pivotally mounted therein is disposed within the cover member 61 for a purpose which will be discussed in greater detail presently.

Figure 11:
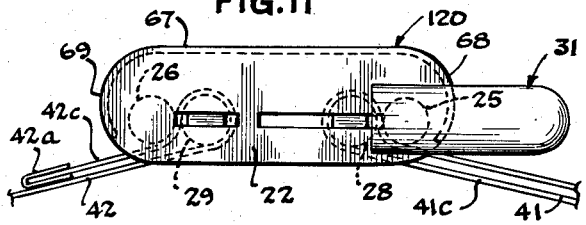
Fig. 11 is a side elevational view of the buckle shown in Fig. 10.
Figure 12:
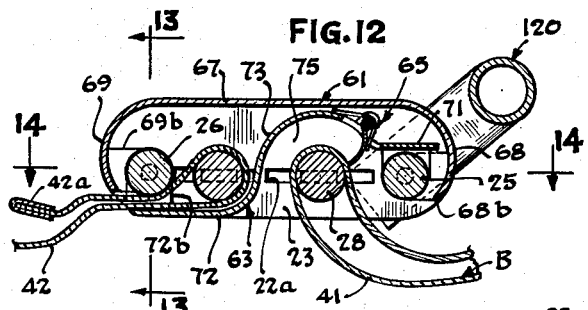
Fig. 12 is a longitudinal sectional view taken substantially along the line 12—12 in Fig. 10, but with parts of the buckle shown in different positions.

The cover 61 embodies a top wall 67, a front wall 68 and a rear wall 69, and is open substantially throughout its bottom, Figs. 10, 11 and 12. The cover 61 may be made of any suitable material, such as, for example, sheet steel, and is preferably made of such size and shape that it fits snugly between the side rails 22 and 23, with the outer faces of the walls 67—69 extending between the side rails 22 and 23 in substantially the same planes as the adjacent corresponding top and end edge portions, so as to afford a relatively smooth buckle 120. Each of the end walls 68 and 69 of the cover 61 has a pair of ears 68a and 68b, and 69a and 69b, respectively, projecting inwardly therefrom in parallel spaced relation to each other, Figs. 10, 12 and 13. The ears 68a and 69a, and the ears 68b and 69b are disposed in parallel juxtaposition to opposite ends of the inner faces of the side rails 22 and 23, respectively. At the one end of the buckle 120 the ears 69a and 69b of the cover 61 are secured in position between the opposite ends of the end bar 26 and the side rails 22 and 23, respectively, by the rivets 37 and 40 which extend through the side rails 22 and 23, respectively, into the ends of the end bar 26. At the other end of the buckle 120, the ears 68a and 68b are similarly secured in position between the opposite ends of the end bar 25 and the side rail 22 and 23, respectively, by the rivets 35 and 36, Fig. 10.

The guide plate 63 may be made of any suitable material such as, for example, sheet steel, and embodies two substantially flat, parallel end portions 71 and 72, interconnected by a substantially arcuate shaped intermediate portion 73, Fig. 12. The guide plate 63 is of such size and shape that it may fit between the side walls 22 and 23 within the cover 61, with the end portion 72 extending between the lower edge portions of the side rails 22 and 23, and with the end portion 71 and the intermediate portion 73 disposed thereabove within the cover 61.

Figure 13:
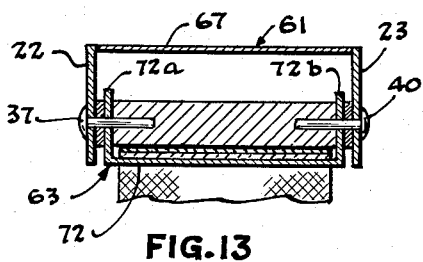
Fig. 13 is a sectional view taken substantially along the line 13—13 in Fig. 12.
Figure 14:
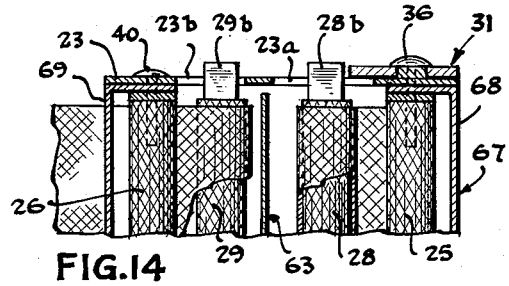
Fig. 14 is a sectional view taken substantially along the line 14—14 in Fig. 12.

Two ears 72a and 72b project upwardly from opposite sides of the rear end portion 72 of the guide plate 63, Figs. 10, 12 and 13, and are disposed in juxtaposition to the inner faces of the ears 69a and 69b, respectively, between the latter ears and the adjacent ends of the end bar 26. The rivets 37 and 40 extend through the ears 72a and 72b, respectively, to thereby secure the rear end portion 72 of the guide plate 63 in position between the side rails 22 and 23.

At the other end of the guide plate 63, two ears 71a and 71b project downwardly from opposite sides of the end portion 71 thereof, and are disposed in juxtaposition to the inner faces of the ears 68a and 68b, respectively, between the latter and adjacent ends of the end bar 25. The rivets 35 and 36 extend through the ears 71a and 71b, respectively, to thereby secure the front end portion 71 of the guide plate 63 between the side rails 22 and 23.

The guide plate 63 is of such size and shape that when it is mounted in normal position between the side rails 22 and 23, the front end portion 71 thereof is disposed in a plane above the end bar 25 and the slide bar 28, with the intermediate portion 73 of the guide plate 63 curved around the slide bar 28 in spaced relation thereto to thereby afford a substantially arcuate shaped passageway 75, Fig. 12, between the intermediate portion 73 and the slide bar 28. It will be seen that the passageway 75 opens downwardly at one end through the open bottom of the buckle 120 between the slide bar 28 and the slide bar 29, and that at the other end thereof, the passageway 75 opens into the space between the slide bar 28 and the end bar 25.

Figure 15:
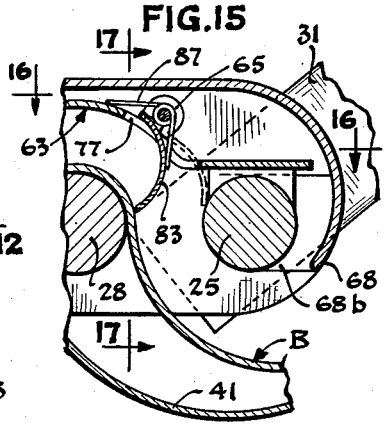
Fig. 15 is an enlarged sectional view of a portion of the buckle shown in Fig. 12.
Figure 16:
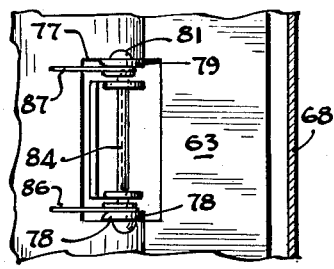
Fig. 16 is a detail sectional view taken substantially along the line 16—16 in Fig. 15.
Figure 17:
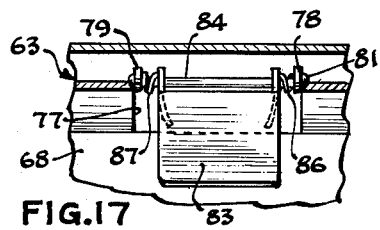
Fig. 17 is a detail sectional view taken substantially along the line 17—17 in Fig. 15.

A substantially rectangular shaped opening 77 is formed in the front portion of the intermediate portion 73 of the guide plate 63, Figs. 10, 12, 15, and 16, and two ears 78 and 79 project upwardly from the intermediate portion 73 in substantially parallel relation to each other at opposite ends of the opening 77, Figs. 16 and 17. A pin 81 is mounted in and extends between the ears 78 and 79, and the guard plate 65 is journalled on and depends from the pin 81 between the ears 78 and 79.

The guard plate 65, Figs. 10, 12, 16 and 17, embodies an elongated finger 83 which may be made of any suitable material such as, for example, a substantially rectangular shaped piece of sheet steel, and has a collar 84 secured along one longitudinal edge thereof by suitable means such as, for example, welding, Figs. 16 and 17. The pin 81 extends through the collar 84, and the collar 84 is disposed between the ears 78 and 79 in spaced relation thereto.

Two torsion springs 86 and 87 are mounted on the pin 81 and are engaged with the top face of the intermediate portion 73 of the guide plate 63 and the front face of the finger 83 of the guard plate 65, Figs. 15 and 16, in position to urge the guard plate 65 to rotate on the pin 81 in a clockwise direction as viewed in Fig. 15.

As is best seen in Figs. 15, 16 and 17, the guard plate 65 is so mounted on the pin 81 that it extends downwardly through the opening 77 into position between the slide bar 28 and the end bar 25. The torsion springs 86 and 87 are so mounted on the pin 81, and are so engaged between the guide plate 63 and the guard finger 83, that the finger 83 is urged thereby toward the slide bar 28. The finger 83 is of such width that when no external forces are being applied thereto, the lower edge portion thereof is held in engagement with the outer face of the slide bar 28 in all positions of the latter, Fig. 12.

With this construction it will be seen that it would be impossible for an operator to feed a belt such as the belt B upwardly between the slide bar 28 and the end bar 25 into the forward end portion of the passageway 75, the guard plate 65 effectively blocking the passageway 75 against such insertion of the belt. However, an operator may feed the belt B upwardly between the slide bars 28 and 29, forwardly of the guide plate 63, so that the belt B moves longitudinally along the passageway 75. The leading end of a belt being thus fed through the passageway 75 engages the guard finger 83, and is effective to pivot the latter in a counter-clockwise direction, as viewed in Figs. 12 and 15, against the urging of springs 86 and 87 towards the open position shown in broken lines in Fig. 15, wherein the lower edge of the finger 83 is disposed in engagement with the outer peripheral surface of the end bar 25, to thereby open the front end of the passageway 75, and permit the belt B to pass on therefrom, downwardly between the slide bar 28 and the end bar 25, and out through the open bottom of the cover 61, Fig. 12.

When a belt such as the belt B has been so threaded into the novel buckle 120, and with the handle 31 disposed in normal at rest position as shown in Fig. 11, it will be seen that tension on the main body portion of the end portion 41 thereof is effective to move the slide bar 28 forwardly along the slots 22a and 23a into position to clamp the end portion 41 of the belt B against the rear face of the end bar 25, Fig. 11, as previously discussed with respect to the preferred form of my invention shown in Figs. 1 to 7, inclusive.

When it is desired to release the buckle 120 from the end portion 41 of the belt B, the handle 31 may be manually pulled forwardly into the position shown in Fig. 12 to thereby move the slide bar 28 to release position, as previously discussed, with respect to the form of my invention shown in Figs. 1 to 7, inclusive, and the belt B may then be quickly and easily withdrawn in a counter-clockwise direction, as viewed in Fig. 12, around the slide bar 28.

It will be noted that the finger 83 of the guard plate 63 is arcuate in shape, and when disposed in fully open position such as shown in broken lines in Fig. 15, affords substantially an extension of the inner face of the intermediate portion 73 of the guide plate 63.

Also, it will be noted that the guard plate 65 is so constructed, and so positioned in my novel buckle 120 that it affords an effective guide for guiding the free end of the end portion 41 of the belt B downwardly between the bars 25 and 28, during threading of the end portion 41 into the buckle 120, and that it will ride freely on the end portion 41 during withdrawal of the latter from the buckle 120.

With the buckle 120 constructed as shown in Figs. 10 to 17, inclusive, it will be seen that a buckle embodying the principles of my invention is afforded which may be quickly and easily threaded in the proper direction by an operator, and which is effectively protected against improper threading by the operator. Hence, it has the advantage not only of affording a covered buckle, but also affording a buckle which may not be improperly threaded in the use thereof.

The modified form of my novel buckle which I have shown in Figs. 18 to 25, inclusive, operates on the same principle as the preferred form of my buckle illustrated in Figs. 1 to 7, inclusive, and on the same principle as the modified form of my buckle illustrated in Figs. 10 to 17, inclusive, and like reference numerals have been used on like parts, and the same reference numerals with the prefix 2 have been used on parts which are similar but which have been substituted for parts of the other forms of my invention. All of the changes made in this latter modified form of my invention over the first-described form and the aforementioned other modified form are in the cover and in the operating mechanism for releasing the slide bar 28.

It will be noted that the changes made in the modified form of my invention shown in Figs. 18 to 25, inclusive, over the form of my invention shown in Figs. 10 to 17, inclusive, comprise the following: The cover 261 is somewhat modified in form, the handle 31 has been eliminated, and two camming levers 91 and 92, Figs. 18, 19, 20, 24 and 25, actuated by the cover 261, are afforded for moving the slide bar 28 to release position.

The cover 261 embodies a top wall 267, which is of such size that it projects laterally and longitudinally outwardly past the side rails 22 and 23, Figs. 18, 24 and 25. The cover 261 also includes a front wall 268 and a rear wall 269 which are disposed forwardly and rearwardly of the side rails 22 and 23, respectively. In addition, the cover 261 includes two side walls 93 and 94 which are disposed outwardly of and parallel to the side rails 22 and 23, respectively.

The cover 261 is pivotally mounted on the side rails 22 and 23, the rivets 37 and 40 extending through the rear end portions of the side walls 93 and 94, and spacer members 37a and 40a being disposed on the rivets 37 and 40, respectively, between the side walls 93 and 94 and the side rails 22 and 23, Fig. 25.

The cam levers 91 and 92 are identical in construction, and each is substantially L-shaped, having a long leg 91a and 92a, and a short leg 91b and 92b, respectively, Figs. 18, 19 and 20. The cam levers 91 and 92 are pivotally mounted on the outer faces of the front end portions of the side rails 22 and 23 by rivets 95 and 96, which extend through the junctions of the legs 91a and 91b, and the legs 92a and 92b, into the side rails 22 and 23, respectively. The rivets 95 and 96 are preferably disposed substantially vertically above the longitudinal center line of the end bar 25.

Two pins 91c and 92c project outwardly from the cam levers 91 and 92 through substantially L-shaped slots 97 and 98, formed in the side walls 93 and 94 of the cover 261, respectively. The slots 97 and 98 have a normally substantially vertically disposed leg 97a and 98a and a normally substantially horizontally disposed leg 97b and 98b, projecting forwardly therefrom, respectively. When the cam levers 91 and 92 are disposed in normal position, with the cover 261 disposed in normal closed position as shown in solid lines in Fig. 19, the legs 91b and 92b project substantially vertically downwardly from the rivets 95 and 96, respectively, and the legs 91a and 92a project substantially horizontally rearwardly from the rivets 95 and 96. With the cam levers 91 and 92 disposed in these positions, and with the cover 261 disposed in normally fully closed position as shown in solid lines in Fig. 19, the pins 91c and 92c are disposed at the upper end portions of the vertical legs 97a and 98a, respectively, of the slots 97 and 98 formed in the side walls 93 and 94 of the cover 261. When the cam levers 91 and 92 are disposed in this position, it will be seen that the slide bar 28 is free to be moved forwardly into abutting position relative to the end bar 25. Hence, when a belt such as the belt B is then threaded around the slide bar 28, within the guide plate 63, the slide bar 28 may be pulled forwardly by tension on the belt B into position to clamp the belt B against the end bar 25, Fig. 19.

When it is desired to release the belt B from such clamping engagement between the slide bar 28 and the end bar 25, the cover 261 may be manually pivoted upwardly into the position shown in broken lines in Fig. 19, wherein the pins 91c and 92c are disposed at the junction of the legs 97a and 97b, and the legs 98a and 98b, respectively, of the slots 97 and 98. It will be noted, in this connection, that the legs 97a and 98b are somewhat arcuate in shape, so that during this upward pivotal movement of the cover 261, the pins 91c and 92c freely move along the slots 97a and 98a.

When the cover 261 is disposed in this partially raised position, it will be noted that the front end portion thereof is disposed above the top edge of the side plates 22 and 23 so that the operator's fingers may be readily disposed beneath the front end potrions of the cover 261 to afford a firm grip thereon. Thereafter, the operator may continue to pull outwardly on the front end portion of the cover 261, to thereby pivot the cover 261 from the partially open position shown in broken lines in Fig. 19 into the fully open position shown in Fig. 20. During this latter movement of the cover 261, the pins 91c and 92c are in engagement with the lower edges of the legs 97b and 98b of the slots 97 and 98, so that the side walls 93 and 94 are effective to pivot the cam levers 91 and 92 in a clockwise direction from the position shown in Fig. 19 to the position shown in Fig. 20, the pins 91c and 92c moving along the legs 97b and 98b of the slots 97 and 98, respectively. During this pivotal movement of the cam levers 91 and 92, the free end portions of the legs 91b and 92b thereof are pivoted rearwardly into engagement with the forward or leading edge of the ears 28b and 28c on the slide bar 28 to thereby cam the slide bar 28 rearwardly in the slots 22a and 23a, respectively, and release the belt B from the clamped engagement between the slide bar 28 and the end bar 25 and free it for withdrawal from the buckle 220.

Thereafter, where it is desired to again thread the belt B into the buckle 220, the cover 261 may be moved into normally closed position to thereby pivot the cam levers 91 and 92 into the aforementioned normal position shown in Fig. 19. The belt B may then be fed upwardly through the passageway 75, between the guide plate 63 and the slide bar 28, and downwardly between the slide bar 28 and the end bar 25. In this position, tension on the belt B is effective to again clampingly engage the free end portion 41 thereof between the slide bar 28 and the end bar 25.

It will be seen that the buckle 220, shown in Figs. 18 to 25, inclusive, affords a novel, practical, covered buckle which may be quickly and easily actuated to release a belt being held thereby, and which is pleasing in appearance and relatively compact and small in size.

From the foregoing it will be seen that I have afforded a novel buckle which may be quickly and easily attached to a seat belt, or the like, in position to effectively hold the belt.

Also, it will be seen that I have afforded a novel buckle which may be quickly and easily released from such a belt.

Also, it will be seen that I have afforded a novel buckle of the aforementioned type which is efficient and effective in operation and may be readily and economically produced commercially.

Thus, while I have illustrated and described the preferred embodiment of my invention, it is to be understood that this is capable of variation and modification.

I claim:

1. A buckle comprising an elongated supporting member, means for attaching the opposite end portions of an elongated strap to the opposite ends of said supporting member, said means including two cross bars mounted in the supporting member in position to clampingly engage one end portion of said strap therebetween, and means for moving one of said cross bars away from the other to release said one end portion of the strap, said moving means comprising a handle member pivotally mounted on the supporting member in position to overlie outwardly of the supporting member said one end portion of the strap when the latter is so clampingly engaged by said cross bars, said means for attaching said straps to said supporting member including arcuate-shaped guide means mounted in said supporting means around said one cross bar and in spaced relation thereto, and stop means mounted in said supporting member in position to blockingly engage said strap when said strap is inserted between said cross bars in one direction and to guidingly engage said strap when said strap is inserted between said cross bars in another direction to thereby guide said strap around said one cross bar into position to be so clampingly engaged between said cross bars.

2. A buckle comprising an elongated supporting member, means for attaching the opposite end portions of an elongated strap to the opposite ends of said supporting member, said means including two cross bars mounted in the supporting member in position to clampingly engage one end portion of said strap therebetween, and means for moving one of said cross bars away from the other to release said one end portion of the strap, said moving means comprising a handle member pivotally mounted on the supporting member in position to overlie outwardly of the supporting member said one end portion of the strap when the latter is so clampingly engaged by said cross bars, said means for moving one of said cross bars including two levers connected to said handle member, said levers being pivotally mounted on opposite sides of said supporting member in position to be moved by said handle into position to operatively engage said one cross bar and move the latter away from the other of said cross bars.

3. A buckle comprising two elongated members, means holding said members in substantially parallel relation, said means including a first cross bar extending between the members and carried by one end portion thereof, each of the members having a substantially straight elongated slot therein extending inwardly away from said first cross bar longitudinally of the member, a second cross bar extending between the members non-rotatably mounted to slide in said slots between a clamping position and a releasing position and having opposite end portions projecting outwardly through the slots, said second cross bar in said releasing position being disposed relative to said first cross bar to permit threading of a flexible belt around the second cross bar and between the cross bars and in said clamping position being disposed relative to the first cross bar to clamp such a belt against the first cross bar, lever means including a pair of lever elements pivotally mounted on the members for movement between a normal and an actuated position each lying outwardly of one of the members and having an end portion engageable with the adjacent end portion of the second cross bar during movement of the lever means from said normal position to said actuated position for camming the second cross bar to said releasing position, said lever element end portions extending in spaced relation to said bar end portions in said normal lever means position, means connecting the other end portions of the lever elements for corresponding movement thereof to effect movement of the lever means between said positions, and spring means connected to said lever means and said members in position to urge said lever means toward said normal position.

4. A buckle as defined in claim 3 and which said lever means comprises a substantially U-shaped handle having two free end portions pivotally mounted on opposite ends of the first cross bar and said sprnig means includes two torsion springs connected to said handle and said members in position to yieldingly urge said handle toward said normal position, and abutment means on at least one of said members in position to stoppingly engage said handle when the latter is disposed in said normal position.

5. A buckle comprising an elongated frame, means on opposite ends of said frame for attaching respective opposite ends of a belt to the frame, said means at one end of the frame including two elongated bars mounted in and projecting transversely across the frame, one of said bars being movable longitudinally of the frame in the plane of the bars toward and away from the other bar into and out of position clamping one end portion of such a belt against the other bar, means for moving the one bar away from the other bar into position releasing such a belt from clamped engagement with the other bar, said moving means comprising cam means pivotally mounted on the frame adjacent said one bar including a pair of lever elements each adjacent a side of the frame, each of said lever elements having an end portion engageable with the one bar for cammingly moving the bar to said release position upon pivotal movement of the cam means, said lever elements being pivotally mounted on the frame, and a cover member for said frame pivotally mounted on the latter and connected to said lever elements.

6. A buckle comprising a housing, means in said housing defining a passageway in said housing for receiving an end portion of a flexible belt therethrough, said means including a guide plate, an end bar mounted in said housing, and a slide bar mounted in said housing between said guide plate and said end bar in substantially parallel relation to the latter, said guide plate and said slide bar defining one end portion of said passageway, said guide plate and said end bar defining another end portion of said passageway, said slide bar being movable toward and away from said end bar into and out of position to clamp such an end portion of a belt against said end bar, and means on said housing for moving said slide bar away from said end bar.

7. A buckle comprising a housing, means in said housing defining a passageway in said housing for receiving an end portion of a flexible belt therethrough, said means including a guide plate, an end bar mounted in said housing, a slide bar mounted in said housing between said guide plate and said end bar in substantially parallel relation to the latter, said guide plate and said slide bar defining one end portion of said passageway, said guide plate and said end bar defining another end portion of said passageway, said slide bar being movable toward and away from said end bar into and out of position to clamp such an end portion of a belt against said end bar, and guard means mounted in said passageway in position to prevent insertion of said end portion of such a belt through said passageway from said other portion into said one end portion and to permit insertion of said end portion of such a belt through said passageway from said one end portion into said other end portion, and means on said housing for moving said slide bar away from said end bar.

8. A buckle comprising a housing, means in said housing defining a passageway in said housing for receiving an end portion of a flexible belt therethrough, said means including a guide plate, an end bar mounted in said housing, a slide bar mounted in said housing between said guide plate and said end bar in substantially parallel relation to the latter, said guide plate and said slide bar defining one end portion of said passageway, said guide plate and said end bar defining another end portion of said passageway, said slide bar being movable toward and away from said end bar into and out of position to clamp such an end portion of a belt against said end bar, and a guard plate mounted on and depending from said guide plate between said bars and pivotable back and forth between said bars, and means connected to said guard plate and yieldingly urging the latter toward engagement with said slide bar into position to close said passageway between said end portions thereof, and means on said housing for moving said slide bar away from said end bar.

9. A buckle as defined in claim 8 and in which said means for moving said slide bar comprises a substantially U-shaped handle having two end legs pivotally mounted on opposite sides of said housing, said handle being pivotable on said housing between a normal position and an actuated position, said legs having end portions engageable with said slide bar in position to move said slide bar away from said clamping position relative to said end bar during movement of such handle from said normal position to said actuated position.

10. A buckle as defined in claim 8 and in which said means for moving said slide bar comprises lever means pivotally mounted on said housing and pivotable between a normal position and an actuated position, said lever means having a portion engageable with said slide bar in position to move said slide bar away from said clamping position relative to said end bar during movement of said lever means from said normal position to said actuated position, and a portion of said housing pivotable relative to the remainder of said housing between a normal position and an actuated position, said portion of said housing being pivotally connected to said lever means in position to move said lever means from said normal position to said actuated position thereof during movement of said portion of said housing from said normal position to said actuated position thereof.

11. A buckle as defined in claim 10 and in which said portion of said housing comprises a cover member including two substantially parallel side walls, and in which said side walls have substantially L-shaped slots therein, and in which said lever means have pins thereon extending into said slots, and in which said slots are so disposed in said sidewalls that during the initial movement of said cover member from said normal position to said actuated position thereof one leg of each of said slots moves longitudinally past a respective one of said pins without moving said lever means, and during continued movement of said cover member toward said actuated position thereof each of said pins moves along the other leg of a respective one of said slots in a direction whereby said lever means are pivoted from said normal position to said actuated position thereof.

References Cited in the file of this patent

UNITED STATES PATENTS

| 899,121 | Meinhardt | Sept. 22, 1908 |
|---|---|---|
| 1,139,036 | Humphrey | May 11, 1915 |
| 2,156,870 | Rineer et al. | May 2, 1939 |
| 2,542,044 | Miller et al. | Feb. 20, 1951 |

FOREIGN PATENTS

| 2,169 | Great Britain | 1878 |
|---|---|---|
| 15,973 | Great Britain | July 3, 1914 |
| 324,786 | Great Britain | Feb. 6, 1930 |
| 223,600 | Germany | June 25, 1910 |